(12) United States Patent
Mucke et al.

(10) Patent No.: US 6,354,013 B1
(45) Date of Patent: Mar. 12, 2002

(54) MEASURING ROLLER FOR DETERMINING FLATNESS DEVIATIONS

(75) Inventors: Gert Mucke, Hilden; Eberhard Neuschutz, Ratingen, both of (DE)

(73) Assignee: BFIVDEh-Institut fur angewandte Forschung GmbH, Dusseldorf (DE)

( * ) Notice: Subject to any disclaimer, the term of this patent is extended or adjusted under 35 U.S.C. 154(b) by 0 days.

(21) Appl. No.: 09/560,275

(22) Filed: Apr. 26, 2000

(30) Foreign Application Priority Data

Apr. 26, 1999 (DE) .......................................... 199 18 699

(51) Int. Cl.⁷ ............................................... G01B 21/20
(52) U.S. Cl. ....................................... 33/533; 33/501.02
(58) Field of Search ............................... 33/533, 501.02, 33/501.03; 73/DIG. 4

(56) References Cited

U.S. PATENT DOCUMENTS

| | | | |
|---|---|---|---|
| 3,581,402 A | * 6/1971 | London et al. | .......... 33/501.03 |
| 4,068,385 A | * 1/1978 | Mitzel | ...................... 33/501.03 |
| 4,916,824 A | * 4/1990 | Shimazutsu et al. | .......... 33/533 |
| 5,519,944 A | * 5/1996 | Delastre | ...................... 33/533 |
| 5,575,075 A | * 11/1996 | Sasaki | ...................... 33/501.02 |

FOREIGN PATENT DOCUMENTS

DE 42 36 657 A1 5/1994

* cited by examiner

*Primary Examiner*—G. Bradley Bennett
(74) *Attorney, Agent, or Firm*—Merchant & Gould P.C.

(57) ABSTRACT

A measuring roller for determining flatness deviations when rolling metal strip measures the stress distribution, for example, with the aid of force measuring sensors over the width of the strip, said sensors being arranged in recesses in the measuring roller at a distance from the wall of the recess and thus being surrounded by an annular gap. The annular gap is closed off to the outside and connected to axially parallel ducts for the feed and discharge of a coolant.

13 Claims, 7 Drawing Sheets

MEASURING ROLLER FOR DETERMINING FLATNESS DEVIATIONS

Figure 1:
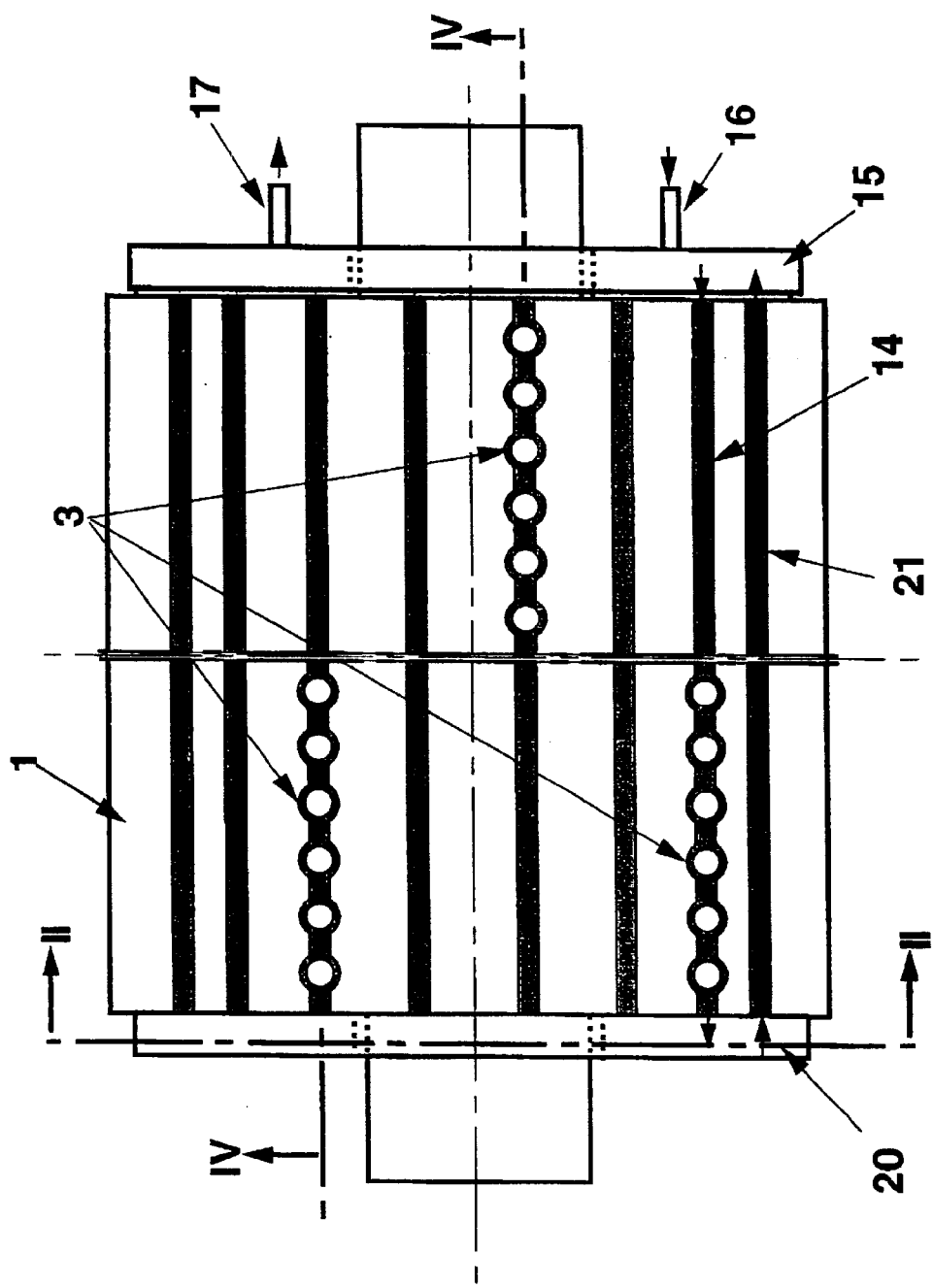

The invention relates to a measuring roller for determining flatness deviations when rolling, in particular when hot-rolling metal strip.

The principal methods used for the conventional measurement of the flatness of hot strip are those which determine the fiber lengths of the strip from the local distance between the surface of the strip and a fixed. reference level (for example the height of the strip above the rolling table) using laser-optic sensors and on the basis of triangulation.

It is only possible to use these methods during the period in which the start of the strip, which is free of tension, passes through the run-out table of the rolling mill train leading to the coiler. For this period, the differences in length of the strip fibers may be formed and measured in the vertical direction as protrusions, in order, with the aid of the measured values, to actuate the final control elements of the roll stand in order to influence the flatness of the strip. After the coiler tension has become active, the automatic profile control changes, for example, the bending of the work rolls as a function of the rolling force measured, with a view to maintaining the flatness achieved at the start of the strip over the entire length of the strip.

The development of new casting techniques, such as casting to dimensions which are close to the final dimensions, for example the CSP technique, and of new plant designs, has made it possible to achieve a strip thickness of well below 2 mm. For this strip thickness, the above-described flatness control based on flatness deviations only at the start of the strip is no longer sufficient. It is necessary to measure the flatness over the entire length of the strip, that is to say under tensile stress. This can be achieved by measuring the stress distribution across the width of the strip.

For this purpose, the strip, for example steel strip, is led with a certain wrap angle over a measuring roller. In this way, using a measuring roller described in German laid-open specification 42 36 657, the result is contact between force measuring sensors or their covers, which are arranged in recesses in the measuring roller which are open at the surface of the roller, and the strip. There is a cylindrical gap between the force measuring sensors which are clamped at the bottom of their recesses and the recess wall surrounding these sensors. This gap may be closed to the outside by means of an O-ring or a polymer layer, in order to prevent the penetration of dirt, for example material abraded from the strip.

Arranging the force measuring sensors at a distance from the wall surrounding them, and closing the annular gap with the aid of an O-ring or, as described in German laid-open specification 42 36 657, by means of a sufficiently elastic polymer, prevents forces which act in the body of the roller during rolling having any adverse effect on the force measuring sensors. Disruption forces of this nature result from the strip tension acting on the measuring roller and the associated bending of the roller. When this happens, the cross section of the roller assumes the form of an ellipse whose longer axis runs parallel to the strip. The bending of the roller is confused by the force measuring sensor with unevenness of the strip if it is transmitted to the measuring sensor by a force bypass.

Irrespective of the type and arrangement of the measuring sensors in the roller holes, the known measuring rollers have the drawback that, because of the temperature sensitivity of the measuring sensors, in particular force measuring sensors, they do not permit hot-rolling. Measuring rollers of this type are normally not suitable for rolling at strip temperatures above 180° C. This also applies to encased rollers; this is because the roller casing does not offer sufficient protection for the force measuring sensors from heat stored in the strip in the case of hot-rolled strip or strip heated as a result of cold forming.

The invention is therefore based on the problem of providing a measuring roller which is also suitable for use at elevated strip temperatures.

In order to solve this problem, according to the invention coolant ducts open in the region of the measuring sensor, for example into an annular gap which is closed to the outside and surrounds the measuring sensor or in annular grooves in the measuring sensor cover and/or in the wall of the recesses.

In detail, for example the circumferential surface of the measuring sensor or a measuring sensor cover can be provided with a polymer layer, which closes off the gap to the outside. The polymer layer has a thickness which is initially greater than the difference between the diameter of the measuring sensor or a measuring sensor cover and the diameter of the recess, that is to say greater than the gap between the measuring sensor or cover and inner wall.

Consequently, the encased measuring sensor, or the encased measuring sensor cover, has a radial oversize with respect to the recess at room temperature. In order to insert a measuring sensor, for example with a coated measuring sensor cover of greater diameter than the measuring sensor, into the recess in the measuring roller, the cover can be overcooled and the roller body can be warmed. As a result, the circumference of the cover with its coating is reduced in size, while the diameter of the recess is increased as a result of thermal expansion. Under these conditions, the cover can be inserted into the recess without difficulty. When the two elements are brought back to room temperature, the cover is automatically clamped in and centered, so that a gap is produced, between the cover and the recess, which is uniform but closed by polymer.

The annular gaps in a measuring roller can also be closed in a simple way by the roller being provided with a casing. This casing not only closes the annular gaps between the measuring sensors and the wall of the recesses, but in addition has still further functions. It is thus possible for the casing—individually or alongside one another—to consist of wear-resistant metals, such as molybdenum, tungsten and tantalum, of carbides such as tantalum, titanium and tungsten carbide, nitrides such as hafnium, titanium and zirconium nitrides, borides such as tantalum, titanium and zirconium boride, silicides such as tantalum or molybdenum silicide, or else of oxides such as $Al_2O_3$, $Cr_2O_3$, $HfO_2$, $TiO_2$ and $ZrO_2$. These wear-resistant materials may be applied, individually and to some extent also alongside one another, as can other materials, by thermal spraying onto a thin-walled steel casing tube, surrounding the roller, as a support for the wear-resistant material.

The casing may comprise a tube encasing the measuring roller as a whole or else a number of tube sections arranged alongside one another. The tube or else the tube sections can be shrunk on or connected mechanically to the body of the measuring roller; they can consist of a material having the desired properties or can be coated with such a material.

In any case, the casing, including any supporting tube, should have a low wall thickness, in order to avoid any force bypass between the body of the measuring roller and the measuring sensors over the route via the casing, but at least to keep this very low. This is because, with constant radial force from the strip, as the wall thickness increases and the gap width decreases, the disruptive forces introduced into the measuring sensor via a force bypass increase. Therefore, the lower the thickness of the casing and the wider the gap surrounding the measuring sensors, the lower is the influence of disruptive forces and the greater also is the bending of the casing in the region of the recesses with the measuring sensors. The gap width should therefore be at least 0.5 mm.

With a very thin casing of, for example, 1 mm, an encased roller is therefore also suitable for the use of distance measuring sensors, provided that these, just like force measuring sensors, are not in contact with the wall of the hole or not in direct contact therewith.

If the casing comprises a number of tube sections with or without a coating, this also has a beneficial effect toward minimizing the disruptive forces (force bypass) acting on the measuring sensors, since a casing comprising a number of tube sections exhibits a more beneficial bending response in the present connection than the roller as such; it does not bend to such a great extent as the roller.

Figure 2:
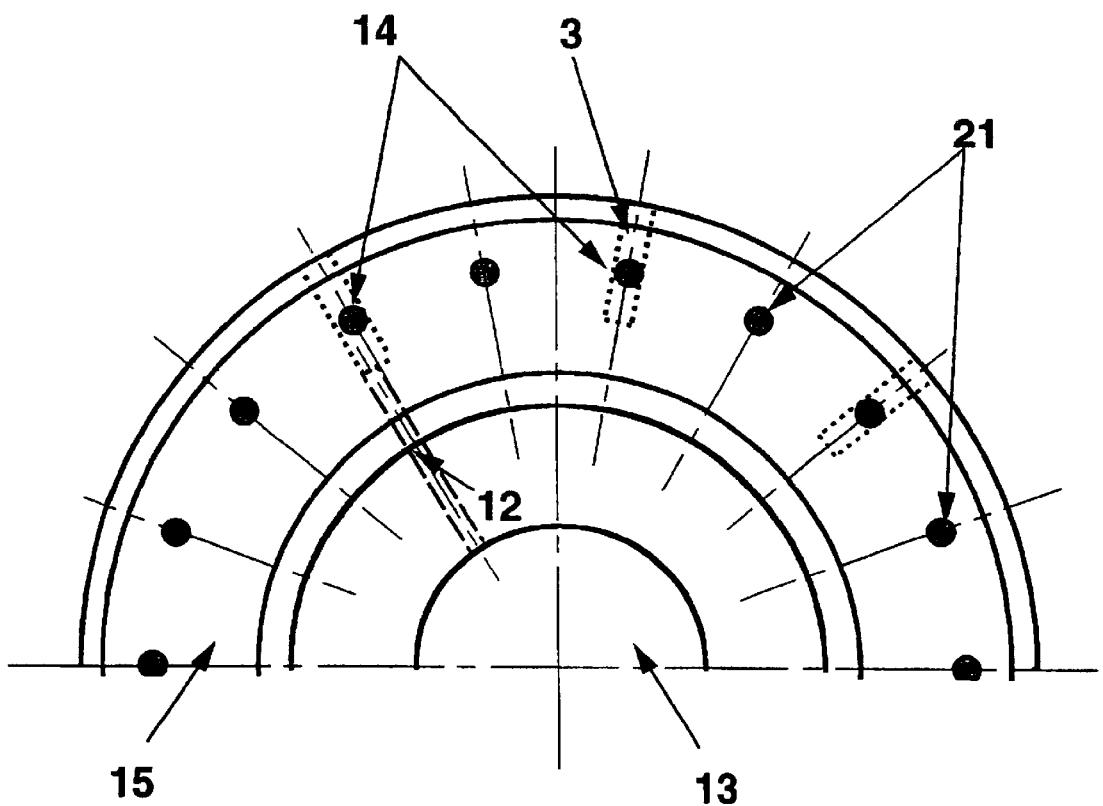
Figure 3:
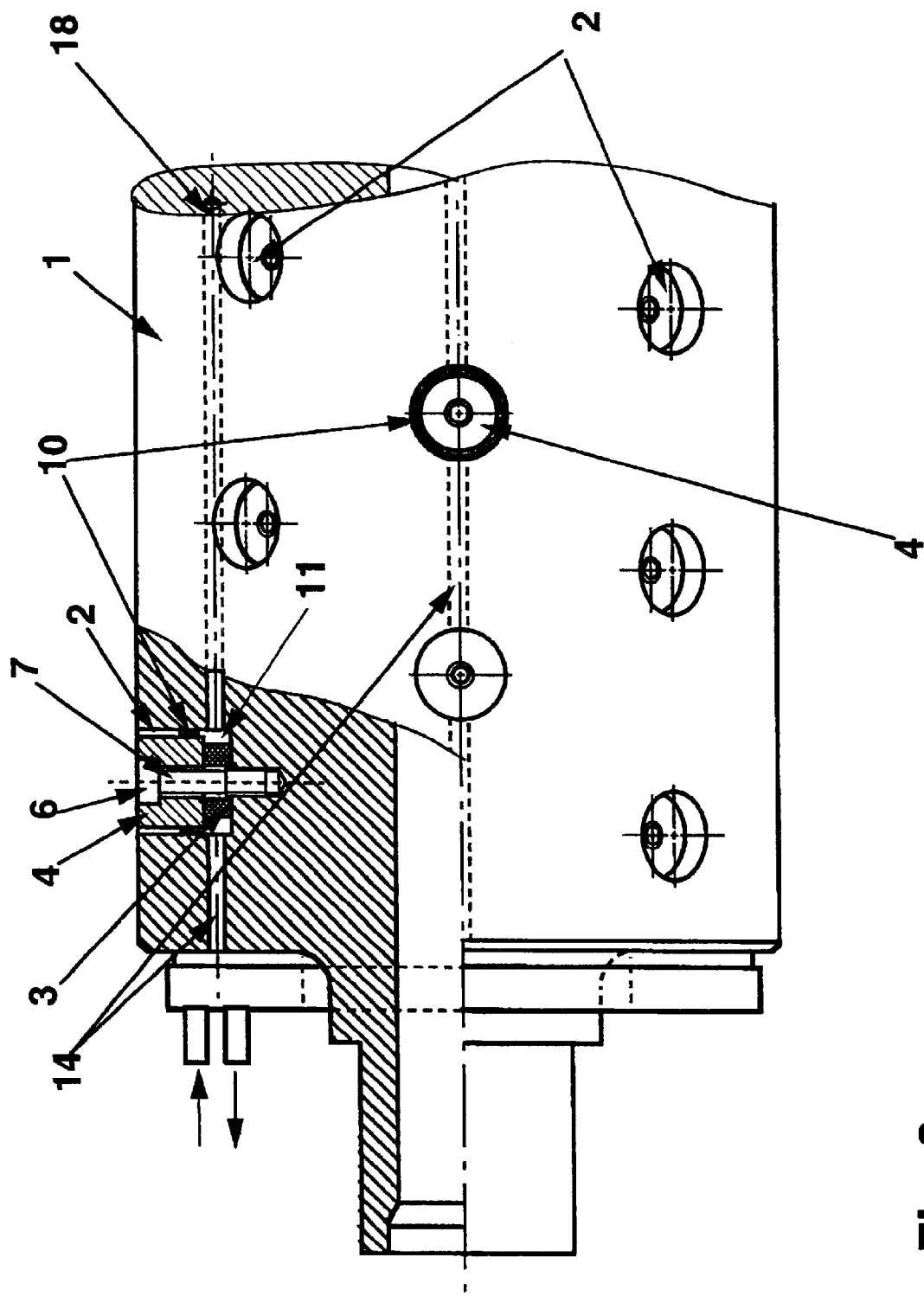
Figure 4:
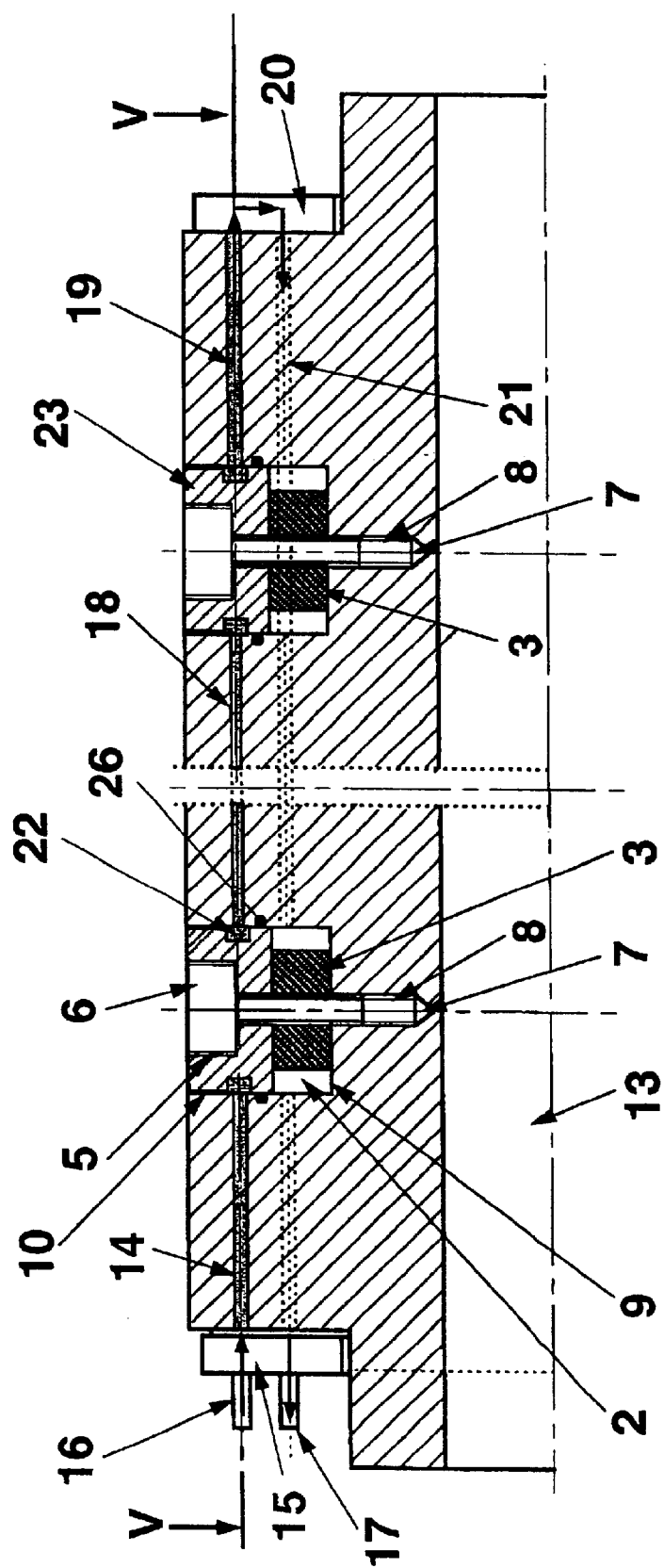
Figure 5:
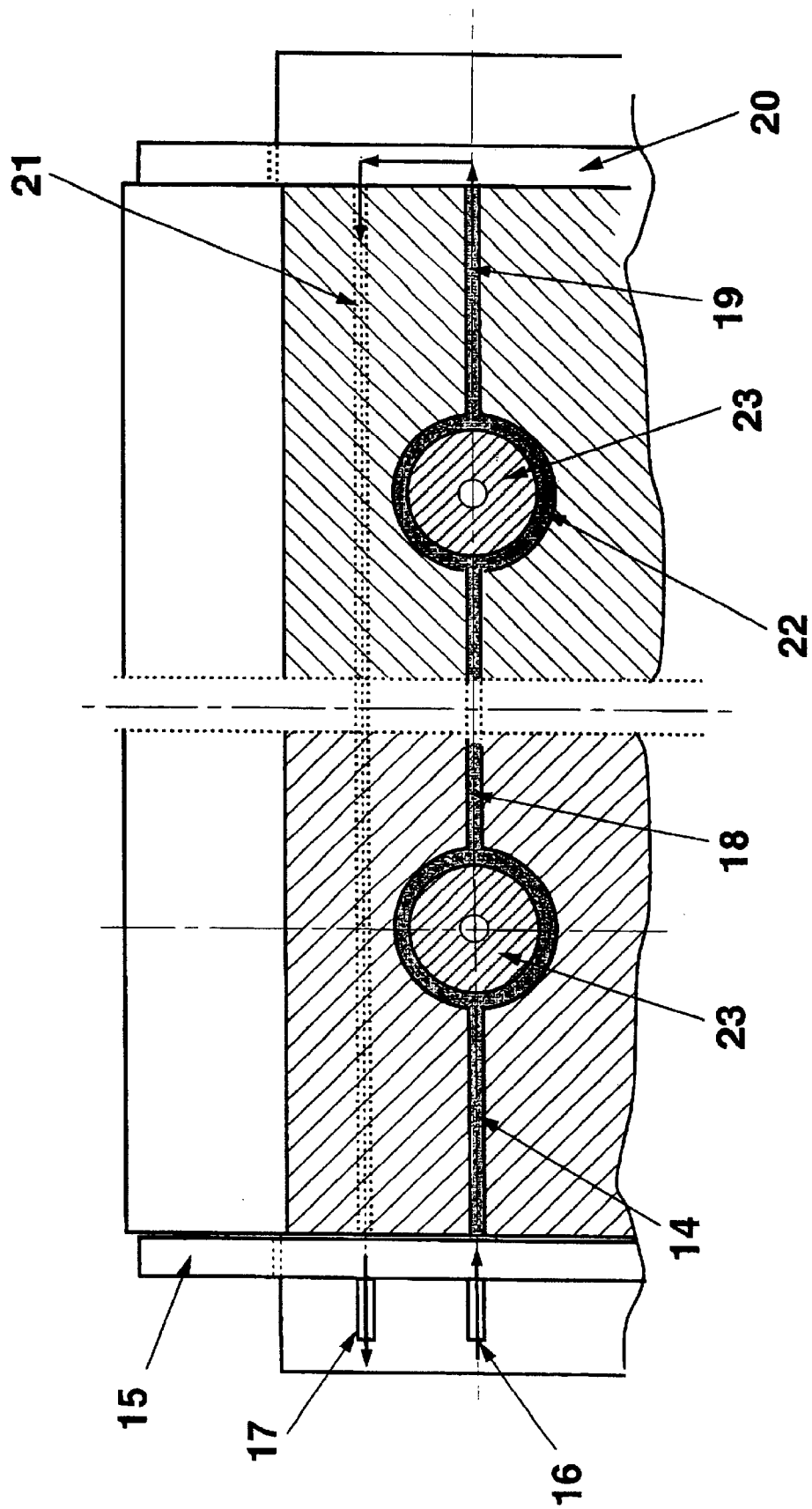
Figure 6:
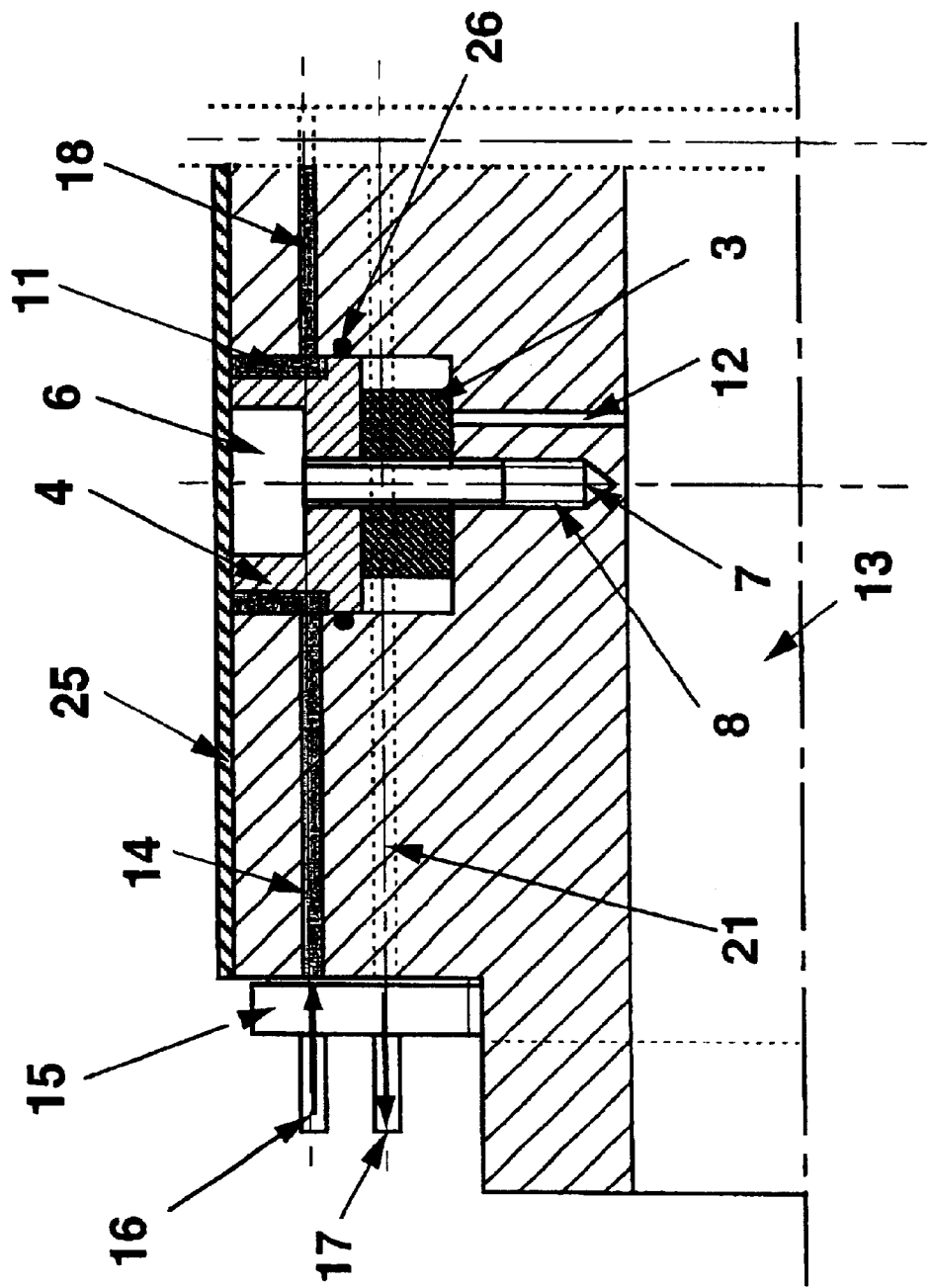
Figure 7:
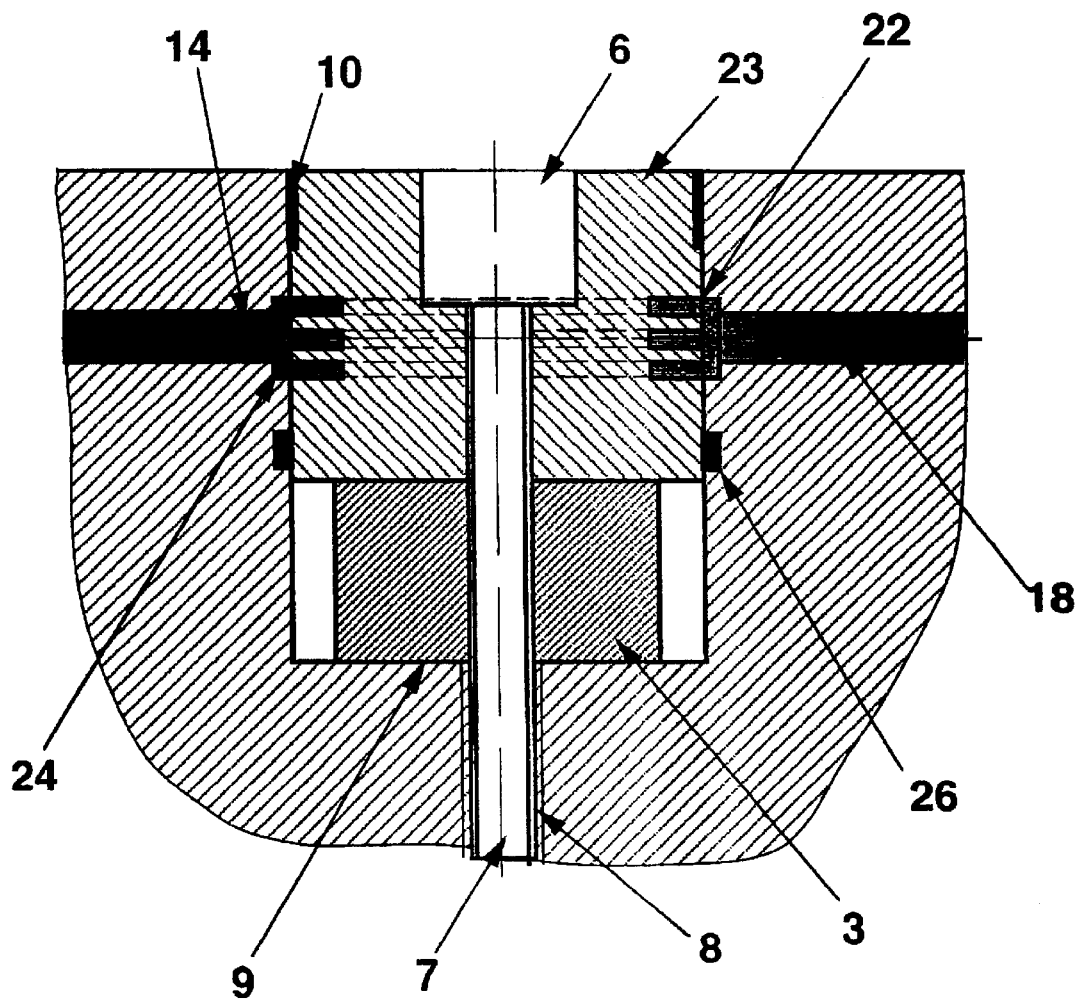

The invention is explained in more detail in the following text with reference to exemplary embodiments illustrated in the drawing, in which:

FIG. 1 shows a schematic illustration with a plan view of the measuring roller according to the invention, FIG. 2 shows the upper half of a front view of the measuring roller along the line II—II in FIG. 1, FIG. 3 shows a partial view of a measuring roller, FIG. 4 shows a section along the line IV—IV in FIG. 1, FIG. 5 shows a longitudinal section through the measuring roller along the line V—V in FIG. 3, FIG. 6 shows an axial longitudinal section through a measuring roller having a casing, and FIG. 7 shows a measuring sensor in an enlarged illustration.

The measuring roller 1 has a large number of recesses 2 which are distributed over the width of the roller and into which measuring sensors, for example displacement or force or piezoelectric measuring sensors 3, in the form of quartz rings, for measuring dynamic and quasi-static forces, with cylindrical covers 4, are inserted. The measuring sensors 3 extend between the bottom 9 of the recess 2 and the cover 4. The cover 4 has a countersink 5, in which there is the head 6 of a tensioning bolt 7, which engages in a threaded hole 8 in the measuring roller 1. Using the tensioning bolt 7, the cover 4, together with the measuring sensor 3, is clamped to the bottom 9 of the recess 2.

The cover 4 is provided with a polymer layer 10. Because of the different diameters of the measuring sensor and of the recess 2, there is a gap 11 between the measuring sensor 3 and the wall of the recess 2 in the roller 1, said gap 11 being closed to the outside by the polymer layer 10 or in another way, when the cover is inserted. The gap can also be located between the measuring sensor cover and the wall of the recess.

Located in the measuring roller 1 are holes 12, which accommodate the measuring lines of the measuring sensors 3. The holes are led to a central hole 13 in the roller axis, through which hole the measuring lines are led out of the measuring roller (not illustrated).

Into the annular gap 11 there opens an axially parallel duct 14, via which the coolant, for example water, passes into the annular gap 11 from a rotary distributor 15 which is located at the end and has connections 16, 17 for the supply and discharge of coolant, said coolant leaving the annular gap again on the opposite side and being fed via duct sections 18 to the next annular gap 11; said coolant ultimately flows via a further duct section 19 (cf. FIG. 4, in which there is a circumferential groove 22 instead of the gap 11) to a rotary distributor 20 on the opposite end of the measuring roller 1. From the distributor 20, the coolant passes back into the distributor 15 via a continuous duct 21. In the same way, the other coolant ducts 14, 18, 19, 21 distributed over the circumference of the measuring roller are also connected to the two distributors 15, 20. In this case, duct sections 14, 18, 19, on one side, and continuous coolant ducts 21, on the other side, alternate over the circumference of the measuring roller in each case. This results in countercurrent cooling of the measuring roller.

Instead of the annular gaps, closed with a layer 10 of polymer, in the measuring roller according to FIG. 3, it is also possible for circumferential grooves 22 to occur in covers 23 and, in the same way as the annular gaps 11, to be incorporated into a coolant circuit 14, 15, 18, 19, 20, 21 and to be supplied jointly with coolant via a groove 24 in the wall.

Finally, however, the annular gaps 11 and the circumferential grooves 22 can also be sealed off to the outside with the aid of a casing or a casing tube 25, and to the inside with the aid of an O-ring 26 (FIGS. 6, 7).

In every case, the result is effective cooling of the measuring sensors or of the measuring roller in its entirety, which avoids stresses in the measuring roller if the duct sections or ducts are distributed uniformly, as illustrated in FIG. 2.

What is claimed is:

1. A measuring roller for determining flatness deviations when rolling thin strip, in particular when hot-rolling thin sheet steel strip, having measuring sensors (3) arranged in recesses (2) at a distance from the wall, coolant ducts (14, 18, 19; 21) opening in the region of the measuring sensors.

2. The measuring roller as claimed in claim 1, wherein the coolant ducts (14, 18, 19; 21) open in a gap (5), which is closed to the outside, between the measuring sensor (3) or a measuring sensor cover (4) and the wall.

3. The measuring roller as claimed in claim 2, wherein the gap (5) is closed by a polymer layer (10).

4. The measuring roller as claimed in claim 1, wherein the polymer layer (10) has a lower modulus of elasticity than the measuring roller (1).

5. The measuring roller as claimed in claim 1, wherein the coolant ducts open into at least one circumferential groove (22) in a measuring sensor cover (4).

6. The measuring roller as claimed in claim 1, defined by a closed casing (25).

7. The measuring roller as claimed in claim 6, wherein the thickness of the casing (25) is about 2 to 5 mm.

8. The measuring roller as claimed in claim 6, defined by a casing sprayed thermally on to a supporting tube.

9. The measuring roller as claimed in claim 6, defined by a ceramic casing.

10. The measuring roller as claimed in claim 1, defined by axially parallel cooling ducts (14, 18, 19; 21).

11. The measuring roller as claimed in claim 1, wherein adjacent cooling ducts (14, 18, 19; 21) are connected to one another.

12. The measuring roller as claimed in claim 11, wherein the cooling ducts (14, 18, 19; 21) are connected to one another via rotary distributors (15, 20).

13. The measuring roller as claimed in claim 1, wherein the cooling ducts (14, 18, 19; 21) are arranged on a circle that is concentric with the axis of the roller.

* * * * *